United States Patent

Yang

[11] Patent Number: 6,067,854
[45] Date of Patent: May 30, 2000

[54] APPARATUS FOR SENSING LIQUID LEVEL

[75] Inventor: F. Y. Yang, Taipei, Taiwan

[73] Assignee: Taiwan Semiconductor Manufacturing Company, Ltd., Hsin-Chiu, Taiwan

[21] Appl. No.: 09/282,530

[22] Filed: Mar. 31, 1999

[51] Int. Cl.[7] .......................... G01F 23/12; H01H 36/00
[52] U.S. Cl. ................................. 73/305; 73/313
[58] Field of Search ........................ 73/305, 313, 319, 73/DIG. 5, DIG. 2, 290 R; 20/84 C

[56] References Cited

U.S. PATENT DOCUMENTS

| | | |
|---|---|---|
| 3,982,087 | 9/1976 | Bachman .............................. 200/84 C |
| 4,064,755 | 12/1977 | Bongort et al. ........................ 73/313 |
| 4,142,079 | 2/1979 | Bachman .............................. 73/313 |
| 4,186,419 | 1/1980 | Sims .................................... 73/313 |
| 5,136,884 | 8/1992 | Lovett .................................. 73/313 |

*Primary Examiner*—Daniel S. Larkin
*Assistant Examiner*—Michael Cygan
*Attorney, Agent, or Firm*—Tung & Associates

[57] ABSTRACT

The level of liquid in a tank is sensed using a pair of magnets arranged such that when in proximity to each other, a magnetic force is generated that activates a micro-switch. One of the magnets is mounted on a float carried on the surface of the liquid and constrained for vertical movement within a tube. The second magnet is stationarily mounted on the tube at a position where the liquid level is to be sensed. A latch mechanism actuated by the movement of the second magnet latches the micro-switch in an actuated position until actuated by the second magnet a second time.

19 Claims, 3 Drawing Sheets

APPARATUS FOR SENSING LIQUID LEVEL

TECHNICAL FIELD

The present invention broadly relates to devices for sensing the level of a liquid in a tank or other reservoir, and deals more particularly with apparatus for measuring discrete, pre-selected levels of liquid in the tank.

BACKGROUND OF THE INVENTION

The art is filled by various types of devices for measuring the level of a liquid contained in a tank or similar reservoir. Some of these devices provide a continuous or instantaneous indication of the liquid level so that an operator or monitoring system is provided with liquid level information at all times. One type of known liquid level sensor merely provides an indication of when the liquid level falls or rises to a pre-elected level indicating, for example, that the liquid level is either too high or too low. This latter mentioned level sensor is often used to control the delivery of liquid from a source into the tank in order to replenish the tank. In such applications, two discrete levels sensor are often employed, one being used to shut off the replenishment supply when the level reaches an upper level, and the other being used to energize a replenishment pump when the liquid level falls to some lower threshold value.

Discrete liquid level sensors are known which employ mechanical float systems used to actuate electric pumps, but these systems are complex in design and often require submersion of many of the moveable mechanical components of the sensor. In order to avoid this problem, others have resorted to non-contact type sensors which operate on the principle of measuring changes in capacitance or inductance, however these level sensors are undesirable in that they are subject to erroneous readings caused by electromagnetic or radio frequency interference. Moreover, these and other types of known electronic sensors are of the "active" type and thus require a constant source of electrical power. Active systems are subject to failure when there is an interruption of electrical supply current or malfunctions of the associated electrical components.

Finally, most known liquid level sensors are designed to be installed in the tank at the time the tank is assembled, and thus are not suitable for retrofit to existing tank or reservoir systems.

Accordingly, there is a clear need in the art for a liquid level sensing system which overcomes each of the deficiencies of the prior art discussed above.

SUMMARY OF THE INVENTION

The present invention provides a system for measuring the level of a liquid in a tank which uses passive components, and thus does not require a source of electrical energy.

According to one aspect of the invention, apparatus is provided for sensing the level of liquid in a tank, comprising a float carried on the surface of the liquid, but confined for vertical movement in a conduit or tube. A magnet is mounted on the float, and thus rises and falls with changes in the liquid level. A sensor assembly is stationarily mounted on or adjacent the float conduit, and includes electrical switch which is actuatable to produce an electrical signal indicating that the liquid level is at a particular value, and means for actuating the switch, which includes a second magnet contained for sliding movement in a tubular housing. Like magnetic poles of the two magnets are arranged such that when the float moves into proximity to the sensor housing, the two magnets produce a repelling, magnetic force which actuates the switch to produce a level detect signal. Actuating means are provided for translating the magnetic force to the switch, which includes latch means that latches the switch in an actuated position until the float moves into proximity to the sensor a second time, whereupon the latch is toggled a second time to change the state of the switch.

According to another aspect of the invention, liquid level sensing apparatus is provided which includes a vertically disposed conduit in fluid communication with a source of liquid whose level is to be sensed, a float contained within the conduit, a first magnetic member carried on the float and first sensing means mounted in proximity to the conduit at a first level where liquid level is to be sensed. The first sensing means includes a mechanically actuated sensor for outputting a signal related to the first level to be sensed, and a second magnetic member slidably mounted within a tubular housing. The first and second magnetic members are arranged such that like magnetic poles thereof are brought into proximity with each other when the fluid in the tank is at the first level, thereby to create a repelling force that is employed to activate the sensing means. A second sensing means is mounted at a different location along the conduit and is similar construction to the first sensing means, and thus senses the liquid level at a second, discrete level.

Accordingly, it is a primary object of the invention to provide apparatus for sensing the level of a liquid in a tank or a similar reservoir which does not require the use of active components requiring electrical power.

Another object of the invention is to provide apparatus as described above which does not expose portions of the sensor to direct contact with the liquid whose level is to be sensed.

A further object of the present invention is to provide apparatus as mentioned above which, once actuated, remains in an actuated latched state without the need for or use of an energy source to maintain the latched state.

A still further object of the invention is to provide apparatus of the type described above which is relatively easy to retrofit to existing tanks and reservoirs.

These, and further objects and advantages of the present invention will be made clear or will become apparent during the course of the following description of a preferred embodiment of the invention.

BRIEF DESCRIPTION OF THE DRAWINGS

In the drawings, which are to be read in conjunction with the present specification and following claims, and wherein like reference numerals are employed to designate identical components in the various views:

DESCRIPTION OF THE PREFERRED EMBODIMENT

Figure 1:
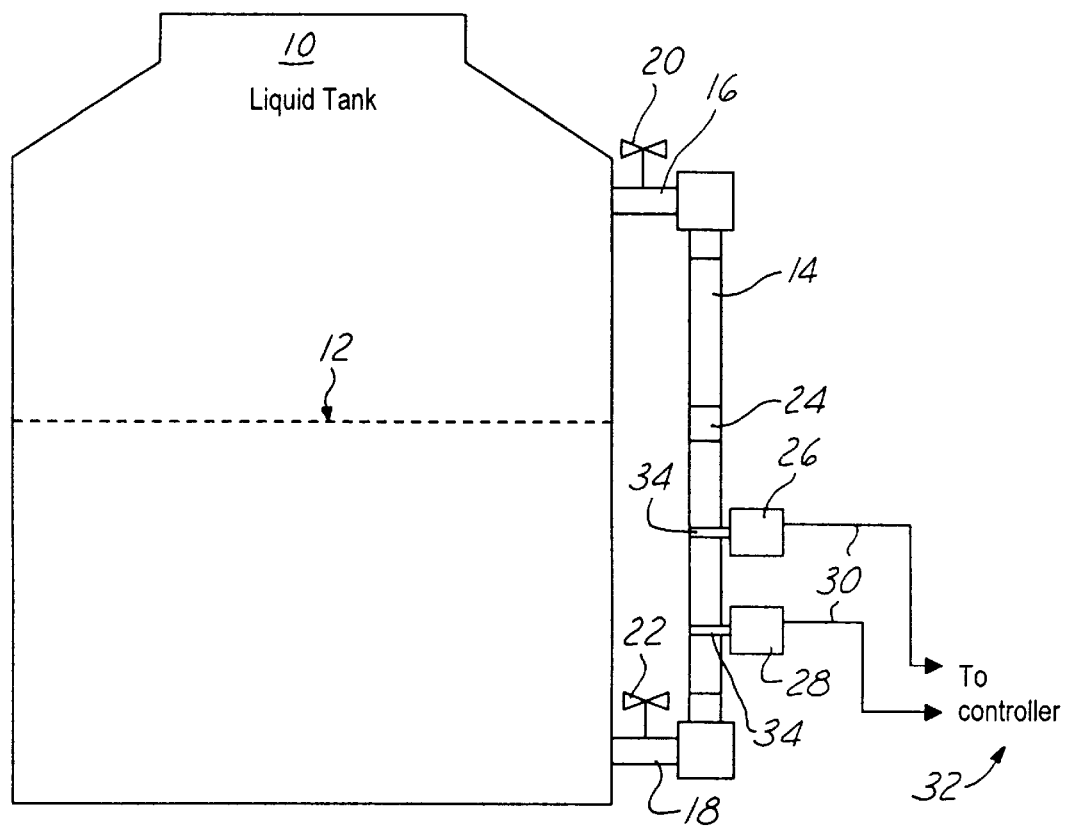
FIG. 1 is a combined block and diagrammatic view of apparatus for sensing the level of liquid in a tank, which forms the preferred embodiment of the present invention.

Referring first to FIG. 1, the present invention relates to apparatus for sensing the level 12 of a liquid in a container or tank 10. For example, in the case where the tank 10 is used as a source of the liquid which is drawn off to a workstation (not shown), it is necessary to periodically replenish the liquid in the tank 10. Therefore, it is desirable to know when the liquid level 12 reaches a lower threshold, signaling the need to replenish the tank with additional liquid. Where automatic filling equipment is used to replenish the tank 10, it is also desirable to know when the level 12 reaches upper threshold level, at which point delivery from the automatic filling equipment is stopped. In other words, in the illustrated embodiment, it is desirable to sense when the liquid level 12 reaches either one of two discrete values.

In accordance with the present invention, a liquid level sensing apparatus is provided for sensing when the liquid level 12 reaches any of various discrete levels in the tank 10. The apparatus broadly comprises a vertically oriented tube-like conduit 14 having its upper and lower ends coupled in fluid communication with the interior of the tank 10 by connecting conduits 16, 18 respectively. A conventional shut-off 22 selectively opens or closes the flow of liquid through conduit 18. A one-way, check valve 20 in conduit 16 allows liquid to flow from the top of tube 14 back into the tank 10, but prevents reverse flow therethrough, i.e. liquid in the tank 10 is prevented from flowing through conduit 16 into the top of tube 14.

With valve 22 open, liquid in tank 10 flows through connector 18, upwardly into the tube 14 and reaches a level in tube 14 identical to the liquid level 12 in tank 10. Disposed within tube 14 there is provided a cylindrically shaped float 24 which floats on or near the surface of the liquid in tube 14. Float 24 rises and falls within tube 14 in accordance with the liquid level 12 in tank 10.

In accordance with the present invention, an electrical switch stationarily mounted in an area of tank 10 consisting of a pair of sensors 26, 28 secured by straps, 34 on tube 14, at vertically spaced locations along the length of the tube 14. The sensors 26, 28 respectively sense when the liquid level 12 is at two different, discrete levels, and upon sensing such levels, output electrical signals on lines 30 to a controller 32 which may be used, for example, to control equipment (not shown) used to replenish the liquid in the tank 10.

Figure 2:
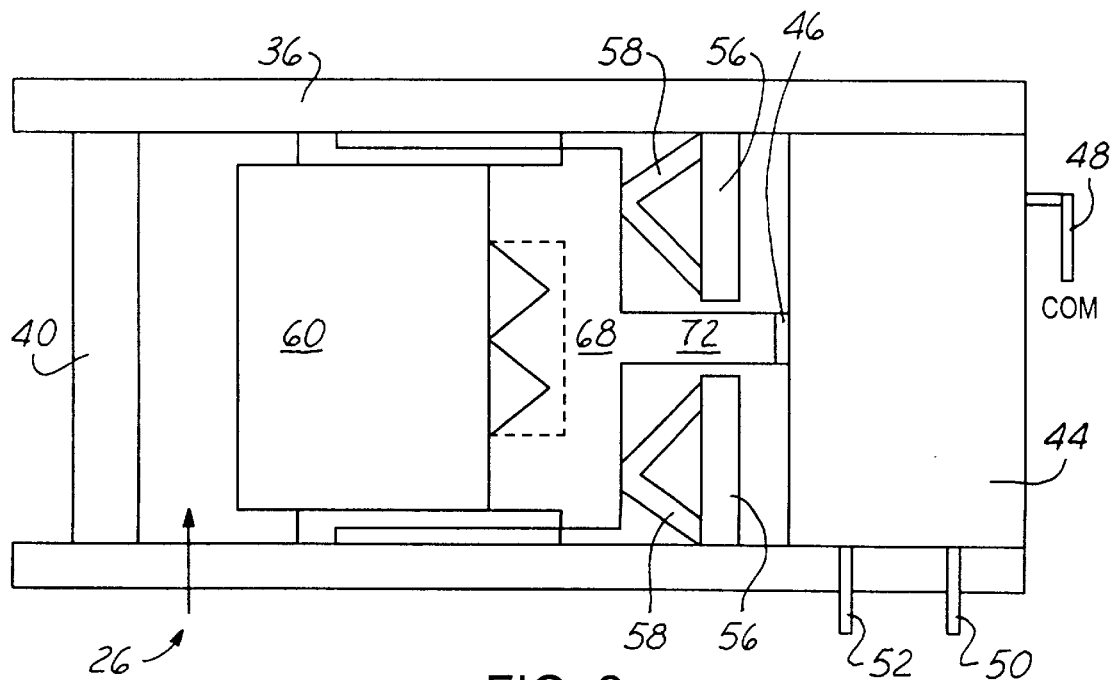
FIG. 2 is an enlarged, cross sectional view of one of the sensors employed in the apparatus shown in FIG. 1.
Figure 3:
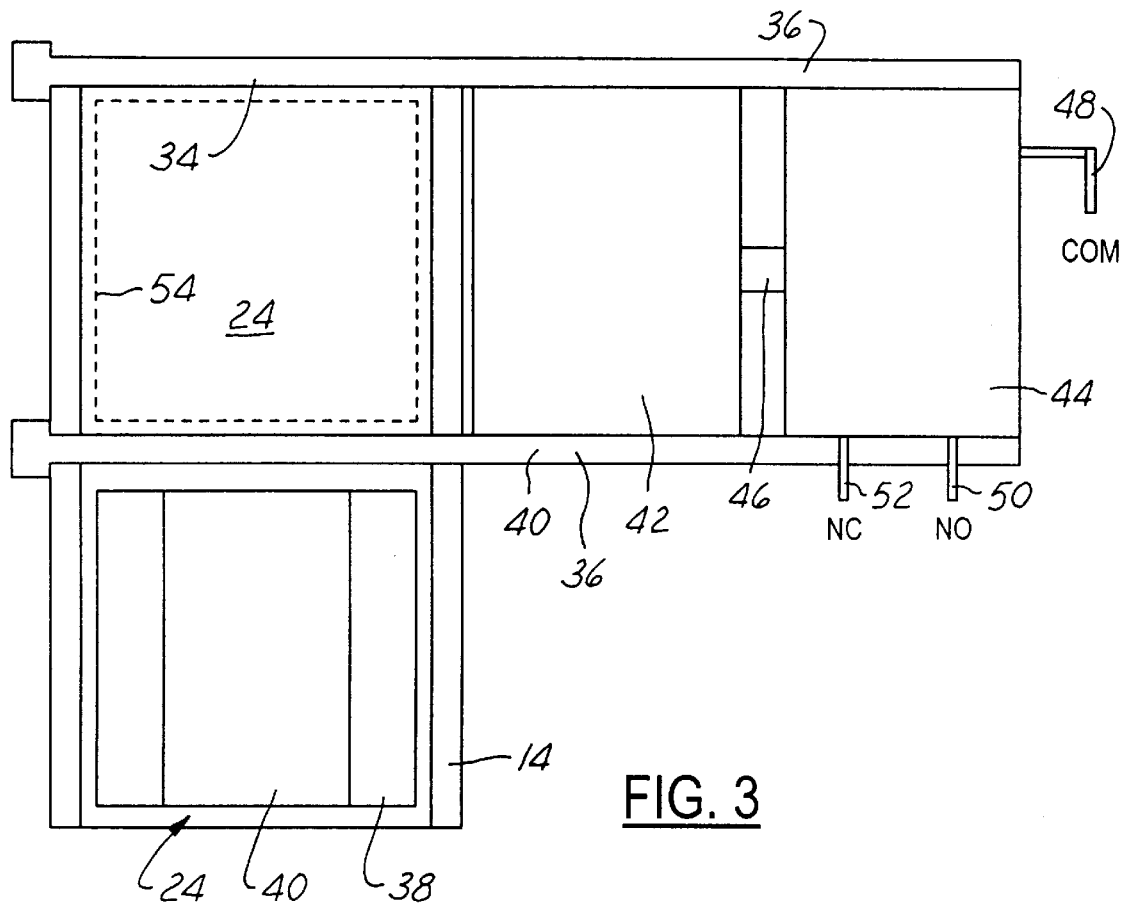
FIG. 3 is a view similar to FIG. 2 but depicting the sensor mounted on the liquid level conduit and showing the float, a second, higher position of the float being indicated in the phantom.
Figure 4:
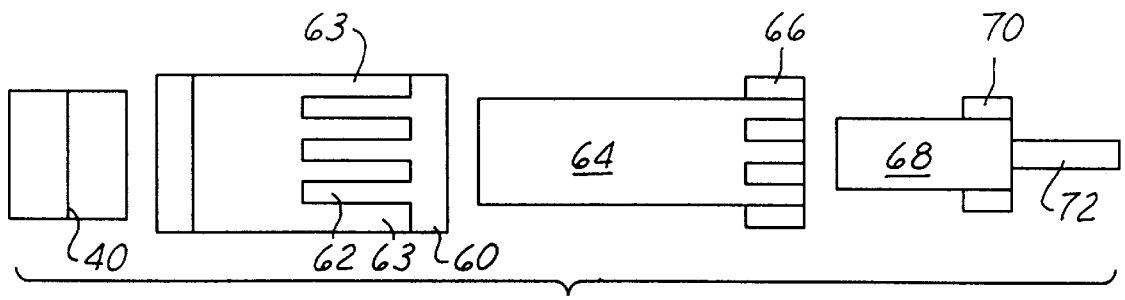
FIG. 4 is an exploded view of the actuating mechanism employed in the sensor shown in FIGS. 2 and 3.
Figure 5:
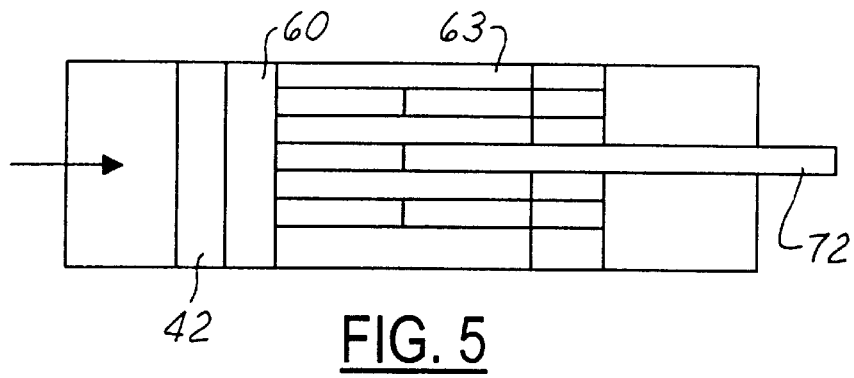
FIG. 5 is a cross-sectional view of the actuating mechanism shown in an actuated position.
Figure 6:
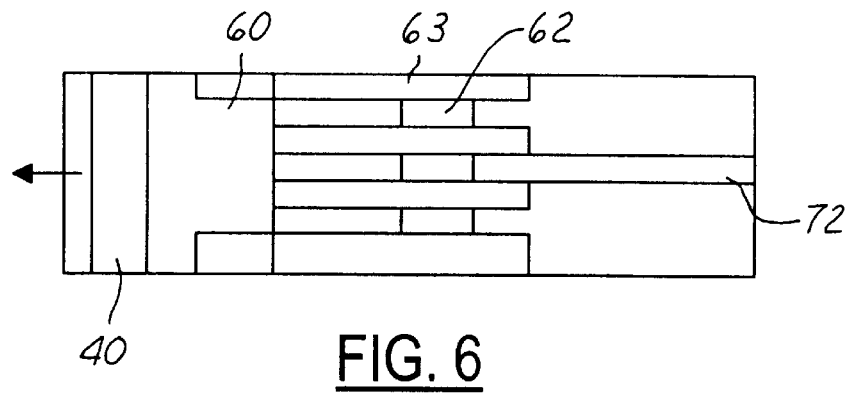
FIG. 6 is a view similar to FIG. 5 but showing the actuating mechanism in its unactuated position.
Figure 7:
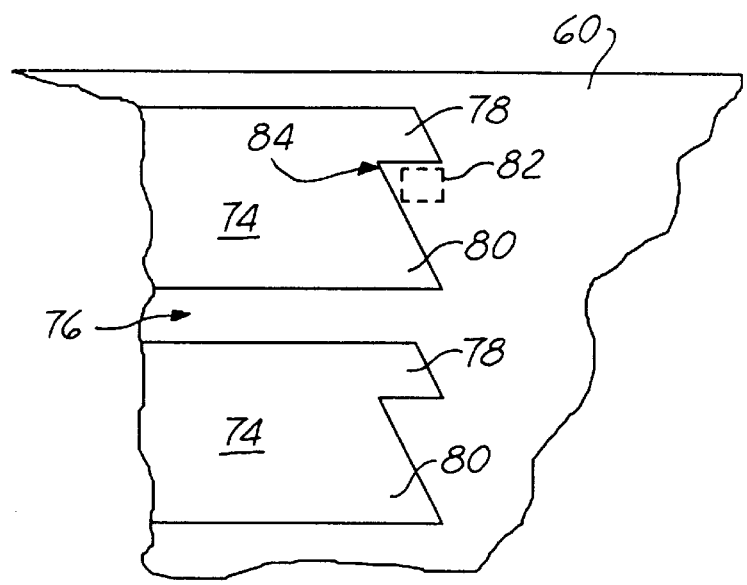
FIG. 7 is an enlarged, fragmentary view of one of the components of the actuating mechanism.

Referring now also to FIGS. 2 and 3, wherein the details of one of the sensors 26 are depicted, the sensor 26 includes a tubular outer housing 36, preferably having a circular cross section, a magnet 40, a combination actuating and latching mechanism 42 and an electrical microswitch 44. The housing is secured as by straps 34 to the conduit 14 such that the magnet 40 is disposed in close proximity to the conduit 14, and thus to the float 24. The float 24 comprises a core of buoyant material, and has mounted thereon a magnet 38. Magnet 40 is laterally disposed within the tubular housing 36. Magnets 38, 40 each have a pair of opposite magnetic poles, and are arranged such that like poles face each other when the float 24 moves through a position indicated in the phantom and designated by the numeral 54. In this latter mentioned position, one pole face of magnet 38 is in close proximity to and faces the like pole face of magnet 40, thus creating a force of repulsion which urges the magnet 40 to slide outwardly (to the right as viewed in FIGS. 2 and 3), imposing a force on the actuating/latching mechanism 42. As will be discussed below in more detail, when the magnet 40 is displaced by this force of repulsion, the actuating/latch mechanism 42 is displaced outwardly within the tubular housing 36 so as to depress a spring loaded push button 46 forming part of the micro-switch 44. The micro-switch 44 is of essentially conventional design having a common terminal 48 and an internal switching arrangement that includes a normally open terminal 50 and a normally closed terminal 52. Thus, when the push button 46 is in its extended, un-actuated position, terminal 50 is open and terminal 52 is closed so as to be connected with common terminal 48. Conversely, when the push button 46 is depressed to activate the micro-switch 44, the connection between, terminal 48 and output terminal 52 is opened, while the connection between terminals 48 and output terminal 52 is switched closed.

A compression spring 58 is disposed between an inner partitioned wall 56 and the actuating/latching mechanism 42 so as to bias the latter as well as the magnet 40 away from the micro-switch 44, and toward the conduit 14. When the liquid level 12 in conduit 14 moves the float 24 to the position shown at 54 in FIG. 3, the force of repulsion between the two magnets 38, 40 overcomes the biasing influence of spring 58, causing the magnet 40 to move outwardly, in turn displacing the actuating/latch mechanism 42. Actuation of the actuating/latch mechanism 42 results in longitudinal displacement of an arm 72 which in turn engages and displaces the push button 46, thereby actuating the micro-switch 44. Furthermore, mechanism 42 includes a later discussed latching arrangement which latches the arm 72 in its extended, actuated position so as to maintain the microswitch 44 in its actuated state, even when the float 24 moves away from position 54. It should be noted here that even though arm 46 remains in its extended, latched state, other portions of the mechanism 42 as well as the magnet 40 are returned to their home positions under the biasing influence of spring 58.

When the float 24 next returns to position 54 the magnetic repelling force generated by the magnets 38, 40 again displace magnet 40 and actuating/latching mechanism 42, thus un-latching arm 72, causing the latter to retract, whereupon push button 46 is released and micro-switch 44 switches back to its un-actuated state.

The actuating/latching mechanism 42 may take any of various forms, but essentially comprises a mechanical arrangement similar to that found in so called push-button type retractable ball point pens wherein a first actuation of the push button extends the pen from a body and latches it in place, and a second depression or actuation of the push button de-actuates the mechanism to allow retraction of the ball point tip under the influence of a biasing spring. The details of one form of the actuating/latching mechanism 42 is shown in FIGS. 4–7. The magnet 40 is received within a central aperture of a guide body 60 which is provided with a plurality of circumferentially spaced, longitudinally extending guide fingers 63 which define guide slots 62. A first cylinder member 64 is received within a central bore of the guide body 63, and is provided with a plurality of circumferentially spaced guide elements 66 which are received in slots 62. A second cylinder 68 is received within a central opening in the first cylinder 64 and is also provided at one end thereof with a plurality of circumferentially spaced ears 70 which nest between the guide elements 66 and act as a catch. The guide arm 72 extends outwardly from one end of the second cylinder 68.

The guide body 63 is stationarily secured within the tubular housing 36, while magnet 40, as well as cylinder 64, 68 are longitudinally displaceable. Essentially, guide body 63 guides the longitudinal movement of the first cylinder 64, and prevents the latter from rotating. Defined on the inner wall of the tubular housing 36 are a plurality of thread like lands 74 which are circumferentially spaced to define guide slots 76 therebetween. The catch ears 70 are guided within slots 76 upon longitudinally displacement of cylinder 64, 68. Each of the lands 74 includes a pair of adjacent, thread like teeth 78, 80, which define a thread root 84. When the magnet 40 displaces cylinders 64, 68, ears 70 ride outwardly through slots 76 until they clear the tooth 80, whereupon cylinder 68 rotates slightly so that each ear 70 rides down the slope of tooth 80 to a position indicated by the numeral 82 within the root 84. In this position, the ears 70, and thus the mechanism 42 is in its latched position. A subsequent displacement of the magnet 40 again displaces the cylinder 68, whereupon the latter rotates slightly so that the ears 70 ride over the tube 78 and back through the slots 76, thus unlatching the mechanism and allowing the arm 46 to withdraw.

From the foregoing, it is apparent that the liquid levels sensing apparatus described above not only provides for the reliable accomplishment of the objects of the invention but does so in a particularly effective and economical manner. It is recognized, of course, that those skilled in the art may make various modifications or additions to the preferred embodiment chosen to illustrate the present invention without departing from the spirit and scope of the present contribution to the art. Accordingly, it is to be understood that the protections sought and to be afforded hereby should be deemed to extend to the subject matter claimed and all equivalents thereof fairly within the scope of the invention.

What is claimed is:

1. Apparatus for sensing the level of a liquid in a tank, comprising:
    a float on the surface of said liquid, said float rising and falling with changes in the level of said liquid;
    first magnetic means carried on and moveable with the float;
    an electrical switch stationarily mounted in the area of said tank and actuatable to produce an electrical signal related to the level of liquid in said tank; and
    means for actuating said switch, said actuating means including second magnetic means disposed proximal to the path of movement of said float and responsive to the magnetic influence of said first magnetic means for applying an actuating force on said switch, said actuating means further includes mechanical latch means responsive to a first proximal encounter of said first and second magnetic means for latching and holding said switch in an actuated condition, and responsive to a second proximal encounter of said first and second magnetic means for unlatching and holding said switch in an un-actuated condition.

2. The apparatus of claim 1, wherein said first and second magnetic means respectively include facing poles of the same polarity, said poles repelling each other to produce said actuating force.

3. The apparatus of claim 1, including a tubular housing for containing said actuating means, and wherein said latch means includes:
    a plurality of longitudinal guides formed in the interior wall of said tubular housing,
    a first cylinder having a plurality of slides respectively slideable within said longitudinal guides and guiding longitudinal movement of said cylinder within said housing,
    a second cylinder received within and rotatable relative to said first cylinder, said second cylinder including a plurality of circumferentially spaced catches, and
    stationary retaining threads within said housing and cooperating with said catches to latch and un-latch said switch in response to successive proximal encounters between said first and second magnetic means.

4. The apparatus of claim 3, wherein said retaining threads are defined on the inner walls of said housing.

5. The apparatus of claim 4, wherein said catches are formed integral with said second cylinders and said catches being received with and normally restrained against rotation by said slides but releaseable from said slides upon engagement with said retaining threads such that said catches are retained with said threads.

6. The apparatus of claim 3, wherein said latch means including means within said housing for normally biasing said first and second cylinders away from said switch and toward said second magnetic means.

7. The apparatus of claim 1, including a liquid conduit disposed outside of but in fluid communication with said tank, said float being disposed in said conduit.

8. The apparatus of claim 7, wherein said switch and said actuating means are mounted on said conduit.

9. The apparatus of claim 1, including a tubular housing mounted on said conduit, said actuating means being disposed within said housing with said second magnetic means being confined for sliding movement within said housing.

10. The apparatus of claim 9, wherein said actuating means includes means responsive to the sliding movement of said second magnetic field for latching and un-latching said switch.

11. Liquid level sensing apparatus comprising:
    a vertically disposed conduit in fluid communication with a source of liquid whose level is to be sensed, such that the liquid level in said conduit follows the liquid level of said source;
    a float contained within said conduit, said float rising and falling with the liquid level in said conduit;
    a first magnetic member carried on said float;
    first sensing means mounted in proximity with said conduit at a first level on said conduit, said first sensing means including a mechanically activated sensor for outputting a signal related to a first level of liquid in said conduit, and a second magnetic member, said second magnetic member being shiftably mounted relative to said sensing means, said first and second magnetic members including face poles of the same polarity disposed in proximity to each other when said float travels into proximity with said first magnetic member, wherein a force of expulsion between said first and second magnetic members causes said second magnetic member to shift and actuate said sensing means.

12. The apparatus of claim 11, wherein first sensing means includes latch means responsive to a first mechanical actuation of said sensor for latching said sensor in an actuated condition, and responsive to a second mechanical actuation of said sensor for un-latching said sensor into an un-actuated condition.

13. The apparatus of claim 11, wherein said first sensing means includes a tubular housing mounted on said conduit and having said second magnetic means slideably mounted therein.

14. The apparatus of claim 11, wherein said sensor includes an electrical switch mechanically actuated between switched and un-switched conditions by the shifting movement of said magnetic member.

15. The apparatus of claim 14, wherein said sensing means includes latch means for alternately latching said switch in said switched and un-switched conditions thereof.

16. The apparatus of claim 11, including second sensing means mounted in proximity to said conduit at a second level on said conduit vertically spaced from said first level, said second sensing means including:

a mechanically actuated sensor for outputting a signal related to said second level of liquid in said conduit, and means responsive to said first magnetic member for actuating the sensor of said second sensing means.

17. The apparatus of claim 12, wherein said latch means includes:

a first cylinder slideable within said tubular housing and driven by said magnetic member, a second cylinder coupled with said first cylinder and slideable within said tubular housing, said second cylinder including a plurality of catches thereon, and retaining threads formed within said tubular housing and cooperating with said catches to latch and un-latch said sensor.

18. The apparatus of claim 17, wherein said latch means includes means for normally biasing said first and second cylinders to slide away from said sensor and said second magnetic member.

19. The apparatus of claim 12, wherein:

said sensor includes an electrical switch having a displaceable button for actuating said switch, said latch means includes cylinder means driven by the force of said second magnetic member and slideable within said tubular housing for displacing said button to actuate said switch, and catch means operated by the sliding movement of said cylinder means for latching and un-latching said button in either of two positions of displacement.

* * * * *